Figure 1:
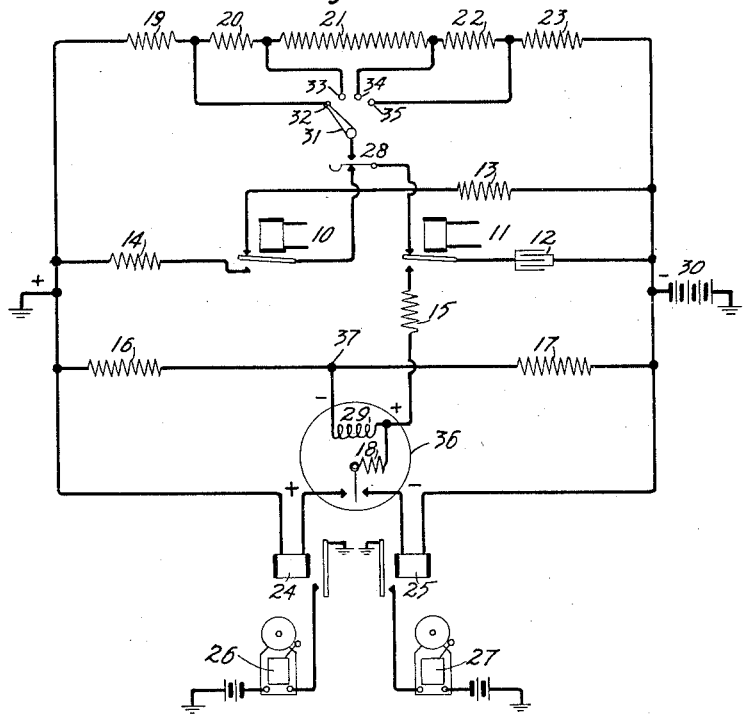

Sept. 15, 1925.

O. R. MILLER

TESTING SYSTEM

Filed Aug. 16, 1924

1,553,322

Inventor:
Ohmer R. Miller
by ⎯⎯⎯⎯ Atty.

Patented Sept. 15, 1925.

1,553,322

UNITED STATES PATENT OFFICE.

OHMER R. MILLER, OF BROOKLYN, NEW YORK, ASSIGNOR TO WESTERN ELECTRIC COMPANY, INCORPORATED, OF NEW YORK, N. Y., A CORPORATION OF NEW YORK.

TESTING SYSTEM.

Application filed August 16, 1924. Serial No. 732,395.

*To all whom it may concern:*

Be it known that I, OHMER R. MILLER, a citizen of the United States of America, residing at Brooklyn, in the county of Kings and State of New York, have invented certain new and useful Improvements in Testing Systems, of which the following is a full, clear, concise, and exact description.

This invention relates to a method and system for measuring relative intervals of time and particularly for giving evidence and electrical indication as to whether an interval of time is within two set limits and further to indicate by electrical means if either of the two set limits has been exceeded and which of the two limits it is that has been exceeded. The invention has particular application to the measurement of relative intervals of time, in laboratory tests and central office maintenance, such as the time elapsed between the operation or release of two different circuits or relays.

An object of this invention is to provide a system which will indicate audibly or visibly if a certain measured time interval is without either of two previously determined time limits, and will give no indication if the measured time interval is equal to the standard time interval set, or is within the predetermined limits set for that standard time interval.

Another object of the invention is to provide accurate means in a system of this type for testing the accuracy of the operation of the device itself.

A further object of the invention is to provide an improved method of comparing an elapsed time interval with a standard measure of time.

There is a definite and well known relationship which exists between voltage and time in an electrical circuit containing capacity and resistance. If a non-inductive resistance is connected in series with a condenser whose capacity is "C" across a constant voltage "E" the voltage across the condenser $E^1$, would build up in accordance with the law:

$$E^1 = E\left(1 - \epsilon \frac{-T}{CR}\right)$$

where E and $E^1$ are measured in volts R in ohms, T in seconds $\epsilon$ is 2.7183 and C is in farads.

From this relationship a logarithmic curve can be plotted with voltage as ordinate and time as abscissa from which curve with a known interval of time the corresponding value of voltage may be determined.

In accordance with the above theory a condenser is provided in the circuit arrangement of this invention which is allowed to accumulate a charge during the time interval to be measured and is subsequently connected through a voltmeter relay to the mid-point of a balanced circuit to determine whether the potential at this point (which represents the standard time interval) is equal to that of the condenser. If the potential is not of the same value the voltmeter operates to close alarm circuits which indicate whether the time interval tested is longer or shorter than the standard. The discharge from the condenser will take place in a direction through the voltmeter to close an alarm circuit which will depend on whether the condenser discharge is larger or smaller than the potential which represents the standard time interval.

A feature of the invention is the provision of means for calibrating and testing the voltmeter relay, comprising a resistance which may be thrown in series with the condenser and a source of current; charging the condenser to the standard potentials in either direction then discharging the condenser through the voltmeter relay and noting if that relay responds to the discharge in the proper manner. For example, if a resistance were cut into the circuit as would produce a potential on the condenser which would be in excess of the potential corresponding to the standard time interval, the voltmeter relay would respond operatively and complete a circuit to the corresponding electrical indicator. Resistances which when cut into the circuit impress potentials on the condenser which represent the set limits of the standard time interval would make the voltmeter relay inoperative to a discharge from the condenser. It is evident that if the voltmeter relay did not respond in accordance with these well established conditions it could be easily adjusted thereto. For this purpose a special adjusting circuit employing only resistances has been added.

Figure 2:
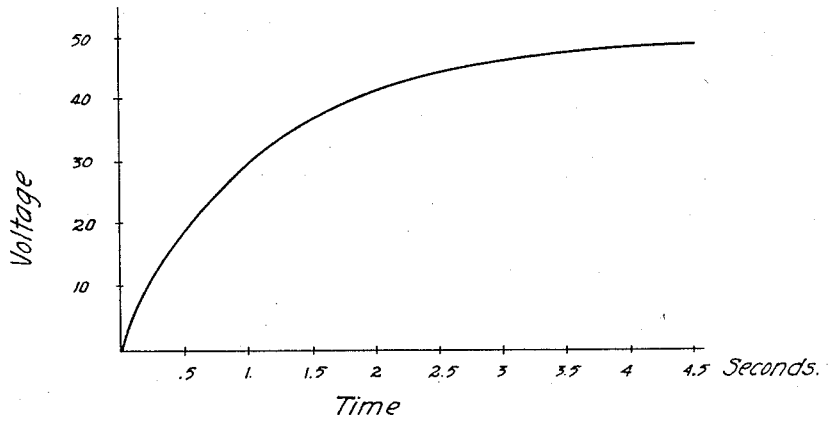

The object and features of this invention can be more easily understood when studied in conjunction with the accompanying drawing of which Fig. 1 discloses a circuit arrangement designed to test relative intervals of time and Fig. 2 a logarithmic curve which shows a definitely known relationship between time and potential for a condenser of known capacity, the condenser charging from a constant potential in series with a constant non-inductive resistance. For a given value of series resistance, capacity, constant charging voltage, and interval of time, the corresponding voltage impressed on the condenser may be found from this curve.

In Fig. 1, 10 and 11 represent two relays or circuit arrangements. The circuit is arranged to check the time from the release of relay or circuit arrangement 10 to the release of relay or circuit arrangement 11. It should be pointed out at this time that the choice of two relays was made with the purpose of simplifying circuit operation. The measurement of the time interval between the release or operation of any two electrical devices or the successive operations of the same device could be effected in a similar manner. 12 represents a condenser which with relays 10 and 11 operated, is shunted by resistance 13. Hence, condenser 12 is normally in a state of discharge. The release of relay 10 connects the condenser 12 through the resistance 14 to ground. The operation of key 28 changes the charging circuit of the condenser 12 from ground through the resistance 14 to ground through one of the four potentiometer points determined by resistances 19, 20, 21, 22 and 23. The release of relay 11 opens the charging circuit to condenser 12 and closes a discharging circuit through resistance 15, voltmeter relay coil 29 to a potentiometer point 37 between resistances 16 and 17 which is the midpoint of a balanced circuit. The voltmeter relay will respond operatively to current flowing through it, which flow is dependent upon the polarity of the difference in potential between point 37 and condenser 12. Relays 24 and 25 operate in response to current flow through the voltmeter relay and when operated close circuits to electrical indicating devices 26 or 27. 30 is the source of battery current and voltage.

Let it now be assumed that the interval of time between the release of relays 10 and 11 is to be measured as compared with a predetermined standard interval of time. With relays 10 and 11 operated, condenser 12 is shunted over the alternate contacts of these relays through resistance 13 and is thus normally in a state of discharge. When relay 10 releases, a charging circuit is closed from battery 30 to condenser 12 over the alternate contact of relay 11 and normal contact of relay 10 through resistance 14 to ground and the normal discharging circuit through resistance 13 is broken. Resistance 14 is of such a value that the condenser is charged practically 60% in the maximum time limit. The release of relay 11 opens the charging circuit of condenser 12 and closes a circuit from the condenser 12 through the normal contact of relay 11, resistance 15, through the voltmeter relay coil 29 to a point 37 between resistances 16 and 17 which point is the midpoint of an initially balanced circuit comprising condenser 12, resistances 14, 16 and 17 and a source of current and voltage 30. If the potential at point 37 is equal to that on condenser 12 no current will flow through the voltmeter relay coil 29. However, if the time between the release of relays 10 and 11 is too short, condenser 12 will not have remained in the charging circuit long enough to accumulate a potential sufficient to maintain a balance in the voltmeter relay-condenser circuit. Therefore current will flow away from the point 37 toward the condenser, operating the voltmeter relay which thereupon locks in a circuit from battery 30, winding of relay 25, contact and winding of voltmeter relay 36, resistances 18 and 16 to ground. The operation of relay 25 in turn closes an obvious circuit for an electrical indicator such as the bell 27. On the other hand if the time interval being measured is too long current will flow from condenser 12 to the winding 29 and the voltmeter relay will lock over a circuit from ground through relay 24, contact and winding of the voltmeter relay 36, resistances 18 and 17 to battery 30, operating relay 24. Relay 24 in turn establishes an obvious circuit for the electrical indicator 26. The operation of relays 24 and 25 could obviously be employed to cause the operation of any desired type of indicator.

Several factors determine the accuracy of this circuit:—

(1) For the time interval mid-way between the set limits the accuracy of the setting of this circuit depends on the accuracy of condenser 12 and resistances 14, 16 and 17. Condenser 12 can vary if resistance 14 is varied in inverse proportion. Resistance 16 can vary if resistance 17 varies in direct proportion. With these proportional relationships existing in this circuit, the balance of potentiometer point 37 and condenser 12 is maintained and is independent of variations in voltage in the circuit which includes resistances 14, 16, 17, condenser 12 and the source of battery current and voltage, 30.

(2) The accuracy of this circuit to measure the amount of time on each side of the midpoint to the set limits is determined by voltage variation, accuracy of resistance 15 and the adjustment of voltmeter relay.

In order that the voltmeter relay may be tested and maintained in proper adjustment an adjustment circuit for the voltmeter relay which duplicates the circuit operating condition that would occur if a known time interval were used is provided. This circuit functions as follows:

The operation of key 28 in conjunction with switch 31 and contacts 32, 33, 34 and 35 changes the charging circuit of condenser 12 from ground through resistance 14 to ground through one of four potentiometer points determined by resistances 19, 20, 21, 22 and 23. A normal charge determined by the potential at the point selected through switch 31 is now impressed on condenser 12. With the release of relay 11 the circuit operation is the same as previously described. As any definite time interval can be translated into a corresponding voltage impressed on condenser 12, the potentiometer in this test circuit can be arranged to duplicate the voltage that any time interval would place on condenser 12.

It should be pointed out that the above circuit is applicable not only to the relative measurement of intervals of time but is also a means of divulging the operating characteristics of different systems. For instance the operating characteristics of a machine switching dial which might include the determination of the time elapsed between successive pulses or the comparative study of a series of pulses.

What is claimed is:

1. In a system for measuring the time interval between the functioning of two responsive devices, the combination of two responsive devices, a condenser, means for charging said condenser, means controlled by the response of one of said devices to initiate the charging of said condenser, means controlled by the response of the other device to terminate the charging of said condenser, a discharge path for said condenser comprising a balanced circuit and a measuring device, and means operated in the response of said second responsive device for closing said discharge path.

2. In a system for measuring the time interval between the functioning of two responsive devices, the combination of two responsive devices, a condenser, means for charging said condenser, means controlled by the response of one of said devices to initiate the charging of said condenser, means controlled by the response of the other device to terminate the charging of said condenser, a discharge path for said condenser comprising a balanced circuit and a measuring device, and means operated in the response of said second responsive device for connecting said condenser through said measuring device to the midpoint of said balanced circuit.

3. In a system for measuring the time interval between the functioning of two responsive devices, the combination of two responsive devices, a condenser, means for charging said condenser, means controlled by the response of one of said devices to initiate the charging of said condenser, means controlled by the response of the other device to terminate the charging of said condenser, a discharge path for said condenser comprising a balanced circuit and a measuring device, means operated in the response of said second responsive device for closing said discharge path, and indicating devices operable by said measuring device.

4. In a system for measuring the time interval between the functioning of two responsive devices, the combination of two responsive devices, a condenser, means for charging said condenser, means controlled by the response of one of said devices to initiate the charging of said condenser, means controlled by the response of the other device to terminate the charging of said condenser, a discharge path for said condenser comprising a balanced circuit and a voltmeter relay, means operated in the response of said second responsive device for closing said discharge path, a pair of relays, each operable in one operated position respectively of said voltmeter relay, and signals operable by said latter relays.

5. In a system for measuring the time interval between the functioning of two responsive devices, the combination of two responsive devices, a condenser, a source of charging current, means controlled by the response of one of said devices to initiate the charging of said condenser, means controlled by the response of the other device to terminate the charging of said condenser, a pair of resistances in series shunt of said source of current, a voltmeter relay, signaling devices controlled thereby, and a discharge path for said condenser extending through said relay to a mid-point between said resistances, effective in the response of said second responsive device.

6. In a system for measuring the time interval between the functioning of two responsive devices, the combination of two responsive devices, a condenser, a source of charging current, means controlled by the response of one of said devices to initiate the charging of said condenser, means controlled by the response of the other device to terminate the charging of said condenser, a balanced circuit including resistances and said source of current, a voltage responsive device, means operated in the response of said second responsive device to establish a discharge path for said condenser through said voltage responsive device to a point in said balanced circuit representing a potential to which said condenser should be charged in a standard interval of time, and two indicating devices controlled by said voltage responsive device, one of said indicating devices operable if the charge of said condenser is greater than the potential at said point indicating a time interval greater than the standard interval and the other of said indicating devices operable if the charge of said condenser is less than the potential at said point indicating a time interval less than the standard interval.

7. The method of measuring the time interval between the functioning of two responsive devices, which consists in successively operating said devices, charging a condenser for the period measured by the successive operation of said devices, establishing a standard potential in a circuit for comparison representing the potential which said condenser should acquire in a known interval, discharging said condenser to said circuit and indicating whether the condenser has acquired a potential greater, equal to, or less than said standard potential and thereby indicating whether the interval under measurement is greater, equal to, or less than the standard interval.

8. In a system for measuring the time interval between the functioning of two responsive devices, the combination of two responsive devices, a condenser a charging path for said condenser, means controlled by the response of one of said devices to initiate the charging of said condenser, means controlled by the response of the other device to terminate the charging of said condenser, a discharge path for said condenser including a potential responsive device and operable in the response of said second responsive device, and means for altering at will the charging path of said condenser.

9. In a system for measuring the time interval between the functioning of two responsive devices, the combination of two responsive devices, a condenser, a charging path for said condenser, means controlled by the response of said devices to initiate the charging of said condenser, means controlled by the response of the other device to terminate the charging of said condenser, a discharge path for said condenser including a potential responsive device and operable in the response of said second responsive device, and means including a key and a potentiometer for altering the charging path of said condenser whereby said potential responsive device may be checked for its operation in response to definite known charges of said condenser.

In witness whereof, I hereunto subscribe my name this 11th day of August A. D., 1924.

OHMER R. MILLER.